US008564636B2

(12) United States Patent
Kim

(10) Patent No.: US 8,564,636 B2
(45) Date of Patent: Oct. 22, 2013

(54) IMAGE FORMING APPARTUS AND CONTROL METHOD THEREOF

(75) Inventor: Se-tae Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 1500 days.

(21) Appl. No.: 12/144,816

(22) Filed: Jun. 24, 2008

(65) Prior Publication Data
US 2009/0040567 A1 Feb. 12, 2009

(30) Foreign Application Priority Data
Aug. 8, 2007 (KR) .................. 10-2007-0079770

(51) Int. Cl.
B41J 2/435 (2006.01)
H04N 1/04 (2006.01)

(52) U.S. Cl.
USPC .......................................... 347/250; 358/474

(58) Field of Classification Search
USPC ....... 347/250, 235; 271/6; 399/394; 359/224; 358/475, 474
See application file for complete search history.

(56) References Cited

U.S. PATENT DOCUMENTS

| 3,137,495 A * | 6/1964 | Eichorn ............................. 271/6 |
| 2002/0063771 A1* | 5/2002 | Nozaki et al. ................. 347/235 |
| 2005/0002712 A1* | 1/2005 | Morita ........................... 399/394 |
| 2007/0146858 A1* | 6/2007 | Matsuda ........................ 359/224 |

FOREIGN PATENT DOCUMENTS

| JP | 60083466 A | * | 5/1985 |
| JP | 62079477 A | * | 4/1987 |
| JP | 64-80162 | | 3/1989 |
| JP | 09090257 A | * | 4/1997 |

OTHER PUBLICATIONS

Korean Office Action dated May 4, 2012 issued in corresponding Korean Patent Application No. 10-2007-0079770.

* cited by examiner

Primary Examiner — Stephen Meier
Assistant Examiner — Carlos A Martinez
(74) Attorney, Agent, or Firm — Staas & Halsey LLP

(57) ABSTRACT

An image forming apparatus includes an image carrying body, a driving unit which rotates the image carrying body in a medium supplying direction, a light scanning unit which comprises a light source and a beam deflecting unit to scan a light beam from the light source to and fro in a main scanning direction to form a scanning line having an image section and a non image section, and a controller which stops the driving unit if the light beam from the beam deflecting unit is on the image section, and drives the driving unit if the light beam is on the non image section.

15 Claims, 6 Drawing Sheets

IMAGE FORMING APPARTUS AND CONTROL METHOD THEREOF

CROSS-REFERENCE TO RELATED APPLICATION

This application claims the benefit of Korean Patent Application No. 2007-79770, filed Aug. 8, 2007 in the Korean Intellectual Property Office, the disclosure of which is incorporated herein by reference.

BACKGROUND OF THE INVENTION

1. Field of the Invention

Aspects of the present invention relate to an image forming apparatus configured to form a plurality of scanning lines by scanning a light beam to and fro on an image carrying body, and a control method thereof.

2. Description of the Related Art

An image forming apparatus forms an electro-static latent image, then a visible image thereof, by way of a developer applied on an image carrying body, and transcribing the visible image on to a print medium to form an image. Specifically, the image forming apparatus includes a light scanning unit to form the electro-static latent image by scanning a light beam in a main scanning direction with respect to the image carrying body moving partially in a sub scanning direction (i.e., an output direction).

The light scanning unit includes a beam deflecting unit to deflect and project the light beam, whereby the beam deflecting unit may be operated by a polygonal mirror method to scan the light beam in a predetermined direction, or a resonance mirror method to scan the light beam to and fro in one direction and then an opposite direction.

In a typical image forming apparatus, the beam deflecting unit utilizing the resonance mirror method scans the light beam to and fro along the main scanning direction on the image carrying body, and at the same time, the image carrying body moves or rotates partially in the sub scanning direction (or the output direction) at an equal speed. Thus, a plurality of the scanning lines is arranged in parallel along the sub scanning direction on the image carrying body to form the electro static latent image. However, because the typical image forming apparatus has the beam deflecting unit scanning the light beam to and fro, while the image carrying body is moved or rotated, the scanning lines are zigzagged on the image carrying body. Thus, gaps between adjacent scanning lines provided along the main scanning direction are not regular. If the gaps between the scanning lines along the sub scanning direction are not regular as described above, the quality of a final image becomes poor when the final image is formed by transcribing the visible image of the image carrying body onto a print medium.

SUMMARY OF THE INVENTION

Accordingly, it is an aspect of the present invention to provide an image forming apparatus in which gaps between adjacent scanning lines arranged along a main scanning direction of an image carrying body are arranged at regular intervals along a sub scanning direction by way of a light scanning unit forming the scanning lines by scanning a light beam to and fro on the image carrying body, and a control method thereof.

Additional aspects of the present invention will be set forth in part in the description which follows and, in part, will be obvious from the description, or may be learned by practice of the present invention.

The foregoing and/or other aspects of the present invention can be achieved by providing an image forming apparatus including: an image carrying body; a driving unit which rotates the image carrying body in a medium supplying direction; a light scanning unit which includes a light source and a beam deflecting unit to scan a light beam from the light source to and fro in a main scanning direction to form a scanning line having an image section and a non image section; and a controller which stops the driving unit if the light beam from the beam deflecting unit is on the image section, and drives the driving unit if the light beam is on the non image section.

According to an aspect of the present invention, the controller may control the driving unit to adjust a rotation speed of the image carrying body to correspond to a driving frequency of the beam deflecting unit.

According to an aspect of the present invention, the image forming apparatus may further include a medium feeding unit which supplies print media to the image carrying body in a way that each print medium has a predetermined transfer gap D with an adjacent print medium, and the controller controls the medium feeding unit to adjust the transfer gap D between the print media to correspond to the adjusted rotation speed of the image carrying body.

According to an aspect of the present invention, the transfer gap D between the print media may be calculated by a formula 1

$$D=(L/Tp)*[Tt-(Ns*Ts)] \quad \text{[formula 1]}$$

where, L is a length of each print medium in the medium supplying direction, Tp is a scanning time for one print medium, Tt is a total time from a point of one print medium to a corresponding point of the next print medium, Ns is a total number of scanning lines for the one print medium, and Ts is a scanning time to form one scanning line.

According to an aspect of the present invention, the light scanning unit may include a detector to detect the light beam from the beam deflecting unit that is scanned to the non image section.

According to an aspect of the present invention, the controller may calculate a time period of an output signal from the detector based on a driving frequency of the beam deflecting unit, and deduce a time band of the image section and the non image section based on the time period.

According to an aspect of the present invention, the controller may measure a time difference of the output signal from the detector in real time and compare the time band with the time difference to determine whether the light beam is on the image section or the non image section.

According to an aspect of the present invention, the beam deflecting unit may include a resonance mirror.

The foregoing and/or other aspects of the present invention can be achieved by providing a control method of an image forming apparatus which includes an image carrying body being rotated in a medium supplying direction by a driving unit and a light scanning unit to scan a light beam on to the image carrying body, wherein the light scanning unit includes a light source and a beam deflecting unit to scan a light beam from the light source to and fro in a main scanning direction to form a scanning line having an image section and a non image section, and a detector to detect the light beam from the beam deflecting unit to the non image section, the method including deducing a time band of the image section and the non image section based on a time period of an output signal from the detector; and controlling the driving unit to stop driving the image carrying body if the light beam is on the image band of the image section, and to drive the image carrying body if the light beam is on the non image section.

According to an aspect of the present invention, the deducing of the time band may include calculating the time period of the output signal from the detector based on a driving frequency of the beam deflecting unit.

According to an aspect of the present invention, the controlling of the driving unit may include determining whether the light beam is on the image section or the non image section by comparing a time difference of the output signal from the detector with the deduced time band.

According to an aspect of the present invention, the control method of the image forming apparatus may further include controlling the driving unit to adjust a rotation speed of the image carrying body to correspond to a driving frequency of the beam deflecting unit before deducing the time band.

According to an aspect of the present invention, the image forming apparatus may further include a medium feeding unit to supply print media to the image carrying body in a way that each print medium has a predetermined transfer gap D with an adjacent print medium, and controlling the medium feeding unit to adjust the transfer gap D between the print media to correspond to the adjusted rotation speed of the image carrying body.

According to an aspect of the present invention, the beam deflecting unit may include a resonance mirror.

According to an aspect of the present invention, an image forming apparatus includes a carrying body to carry an electro-static latent image formed from a series of scan lines; a light scanning unit to produce and deflect a light beam selectively carrying image information to form the series of scan lines on the carrying body; and a driving unit to rotate the carrying body in increments corresponding to the series of scan lines when the light beam does not carry image information.

According to an aspect of the present invention, a method of forming an image using an image forming apparatus includes producing and deflecting a light beam selectively carrying image information to form a series of scan lines on a carrying body; forming an electrostatic latent image from the series of scan lines on the carrying body; and rotating the carrying body in increments corresponding to the series of scan lines when the light beam does not carry image information.

According to an aspect of the present invention, an image forming apparatus includes a carrying body to carry an electro-static latent image formed from a series of scan lines; a light scanning unit to produce and deflect a light beam to form a non-image section and an image section in each scan line, wherein the non-image section is formed from the light beam not carrying image information and the image section is formed from the light beam carrying the image information; and a driving unit to selectively rotate the carrying body in increments corresponding to the series of scan lines according to whether the light beam is forming the non-image section.

According to an aspect of the present invention, a method of forming an image using an image forming apparatus includes producing and deflecting a light beam to form a series of scan lines on a carrying body, each scan line having a non-image section and an image section, and the non-image section is formed from the light beam not carrying image information and the image section is formed from the light beam carrying the image information; and selectively rotating the carrying body in increments corresponding to the series of scan lines according to whether the light beam is forming the non-image section.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
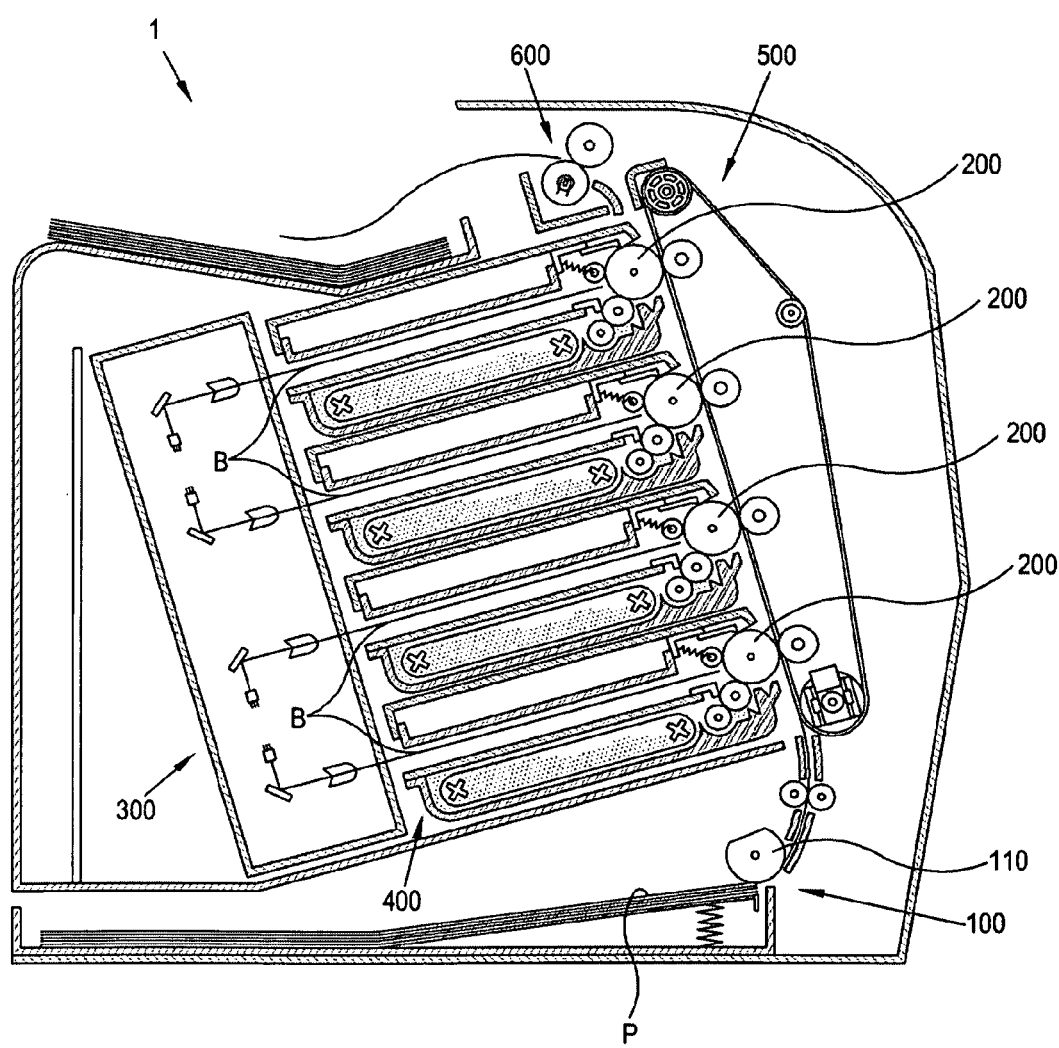
FIG. 1 is a side elevational view of an image forming apparatus according to an aspect of the present invention.

Reference will now be made in detail to aspects of the present invention, examples of which are illustrated in the accompanying drawings, wherein like reference numerals refer to like elements throughout. The aspects are described below in order to explain the present invention by referring to the figures.

FIG. 1 is a side elevational view of an image forming apparatus 1 according to an aspect of the present invention. As illustrated in FIG. 1, the image forming apparatus 1 includes a medium feeding unit 100 to load and supply a print medium P, a plurality of image carrying bodies 200 to form a visible image by utilizing an electrostatic latent image and a developer, a light scanning unit 300 to form the electrostatic latent image on the image carrying body 200, a developing unit 400 to supply the developer to the image carrying body 200, a transferring unit 500 to transfer the visible image of the image carrying body 200 on to the print medium P, a fusing unit 600 to fuse the transferred unfixed visible image on to the print medium P, and a controller 700 to control the above specified elements.

The medium feeding unit 100 loads a plurality of print media P and supplies each print medium P to the image carrying body 200 periodically by control of the controller 700. The medium feeding unit 100 includes a pick up roller 110 which picks up the print medium P to supply the print medium P. The pick up roller 110 also adjusts a transfer gap of the print media P by driving (or operating) and stopping itself.

The image carrying body 200 may be one of a plurality of elements, such as one of four elements corresponding to yellow, magenta, cyan, and black colors. The image carrying bodies 200 are arranged in a row along a transfer path of the print medium P so as to form a color image on the print medium P. When forming an image, an outside surface of the image carrying body 200 is uniformly charged, then a difference of an electric potential is generated by a light beam B from the light scanning unit 300 to form the electrostatic latent image. If the developer is supplied from the developing unit 400 to the image carrying body 200, on which the electrostatic latent image is formed, a visible image (such as the color image) is formed on the image carrying body 200 by the developer.

The light scanning unit 300 scans the light beam B to form the electro-static latent image on the respective image carrying bodies 200. The light scanning unit 300 divides image information of the color image corresponding to a final image into different color components and the light scanning unit 300 forms the electrostatic latent image on the respective image carrying body 200 based on the divided image information. The detailed explanation about the light scanning unit 300 will be described later.

The developing units 400 are provided to correspond to the respective image carrying bodies 200, which correspond to the respective colors of the developer. Thus, the visible images of one of the different colors are formed on the respective image carrying bodies 200.

The transferring unit 500 transfers the print medium P through the respective image carrying bodies 200 in sequence. Also, the visible images of the respective image carrying bodies 200 are transferred and piled on (aggregated on or accumulated on) the print medium P by the transferring unit 500.

The fusing unit 600 provides heat and pressure to the print medium P having the transferred visible image by way of the transferring unit 500 to fix the visible image.

Figure 2:
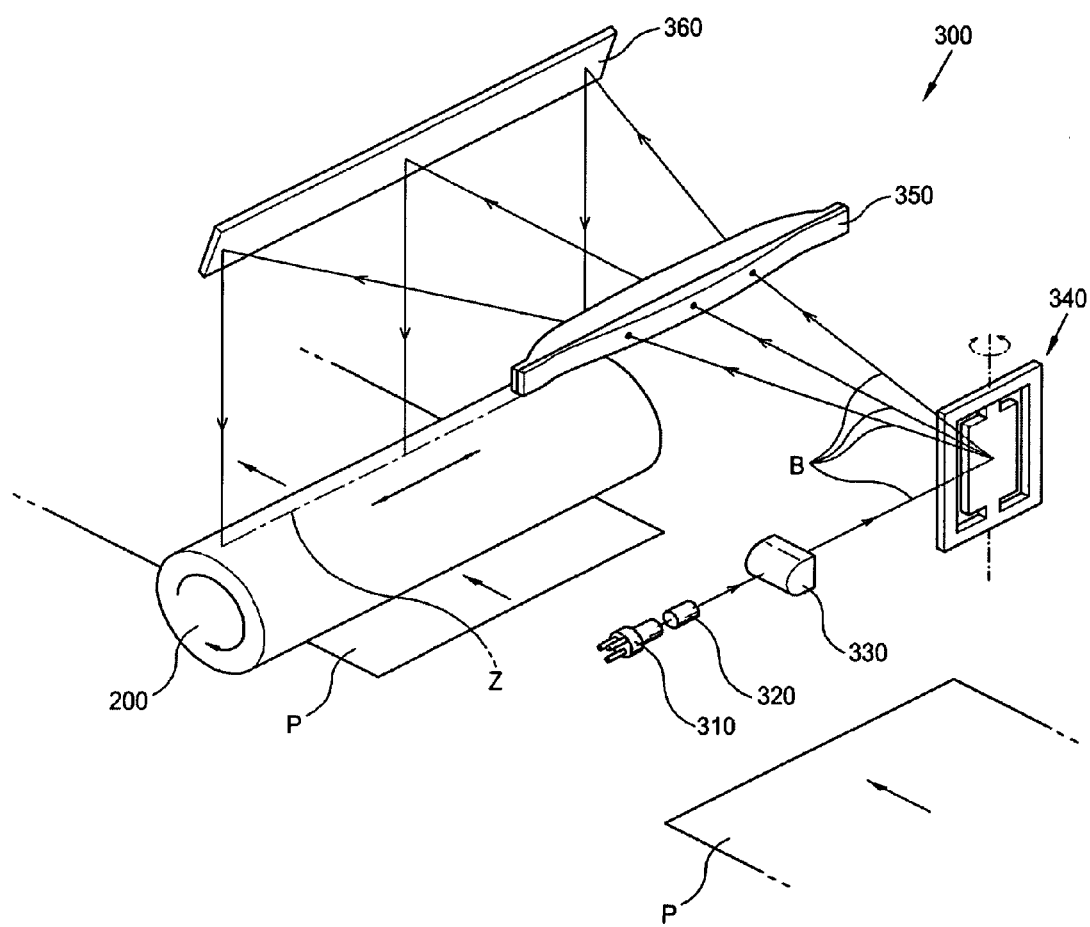
FIG. 2 is a perspective view of a light scanning unit in the image forming apparatus of FIG. 1.
Figure 3:
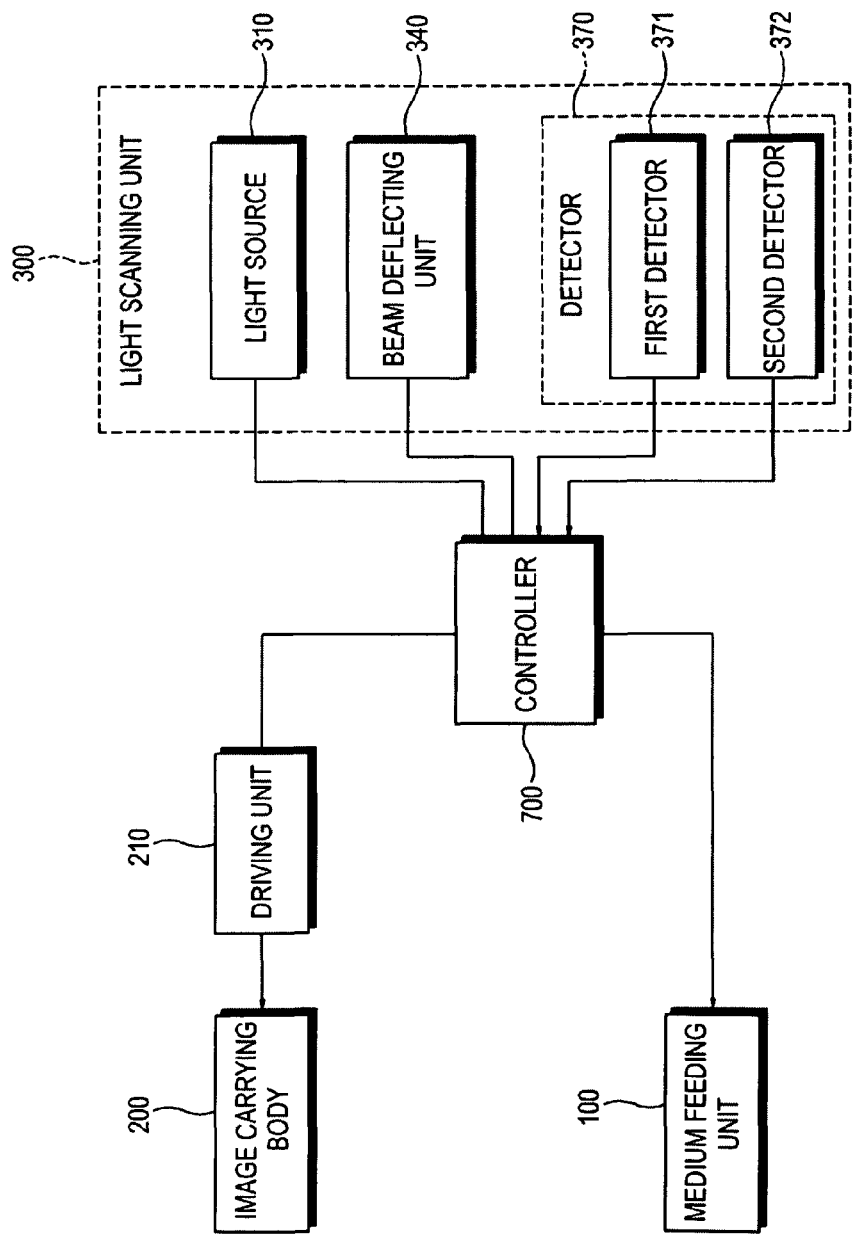
FIG. 3 is a control block diagram of some elements of the image forming apparatus of FIG. 1.

FIG. 2 is a perspective view of a light scanning unit 300 in the image forming apparatus 1 of FIG. 1. FIG. 2 illustrates a configuration of one image carrying body 200 and the light scanning unit 300 scans the light beam B to the image carrying body 200 in the image forming apparatus 1. FIG. 3 is a control block diagram of some elements of the image forming apparatus 1 of FIG. 1.

As illustrated in FIGS. 2 and 3, the image carrying body 200 rotates in an output direction or a medium supplying direction in partial increments (hereinafter referred to as a sub scanning direction) by a driving unit 210, so that the light beam B deflected from the light scanning unit 300 is scanned toward a main scanning direction (i.e., a direction along an axis of the image carrying body 200) to form a series of scanning lines Z on an outside surface of the image carrying body 200. In this case, the scanning lines Z in the main scanning direction are arranged in parallel along the image carrying body 200 in the sub scanning direction because the image carrying body 200 rotates toward the sub scanning direction. Thus, the electrostatic latent image is formed on the image carrying body 200.

The light scanning unit 300 includes a light source 310 to generate the light beam B, a beam deflecting unit 340 to deflect the light beam B from the light source 310 to the image carrying body 200 to form the scanning line or lines Z, and a detector 370 to detect the deflected light beam B from the beam deflecting unit 340.

The light source 310 is turned on or off by the controller 700 to generate and emit at least one light beam B in correspondence to an image signal. The light source 310 may be embodied by a semiconductor device such as a laser diode. Also, the light source 310 may emit one beam or multiple beams according to a configuration thereof. For example, the light source 310 is capable of emitting multiple beams at the same time if the light source 310 is embodied with diodes having a plurality of source points to emit light.

The light source 310 generates the light beam B that includes the image information based on received image information. Each image information corresponds to a predetermined scanning direction and an opposite scanning direction of the scanning line Z. In other words, if the light beam B is to be scanned toward the predetermined scanning direction by the beam deflecting unit 340, the light source 310 receives the image information corresponding to the predetermined scanning direction. On the other hand, if the light beam B is to be scanned toward the opposite scanning direction by the beam deflecting unit 340, the light source 310 receives the image information corresponding to the opposite scanning direction.

The beam deflecting unit 340 forms the scanning line Z on the image carrying body 200 by scanning the light beam B from the light source 310 to and fro along a length of the image carrying body 200. In an aspect of the present invention, the length of the image carrying body corresponds to the axis of the image carrying body 200. The beam deflecting unit 340 is applied to a resonance mirror arrangement for the above operation. The beam deflecting unit 340 of the resonance mirror arrangement scans the light beam B by oscillating at a predetermined resonance frequency, in other words, a driving frequency. Here, as the configuration of the beam deflecting unit 340 is widely known in this art, a detailed explanation thereof will be omitted.

A collimating lens 320 and a cylindrical lens 330 may be further positioned on a path of the light beam B between the light source 310 and the beam deflecting unit 340. Also, an f-θ lens 350 and a scanning line reflecting mirror 360 are installed on the path of the light beam B between the beam deflecting unit 340 and the image carrying body 200. The collimating lens 320 converges the light beam B from the light source 310 to make a convergent light. Herein, an angle of the light beam B between the collimating lens 320 and the f-θ lens 350 toward the main scanning direction has some value so that the light beam B is not parallel but is converged. In other words, the collimating lens 320 may be arranged as a finite optical system.

The cylindrical lens 330 refracts the light beam B only toward the sub scanning direction, so that the cylindrical lens regularizes (or makes consistent) the pattern of the light beam B passing through the collimating lens 320 to form an image in a line shape on the beam deflecting unit 340. The f-θ lens 350 includes a lens having an incident side and an emit side, and the f-θ lens 350 corrects a magnification of the light beam B deflected by the beam deflecting unit 340 so that the scanning line Z is formed on the image carrying body 200, and the magnifications with respect to the main scanning direction and the sub scanning direction are different. The scanning line reflecting mirror 360 changes the path of the light beam B between the beam deflecting unit 340 and the image carrying body 200.

The detector 370 may be a photo sensor, for example, and is positioned on the path of the light beam B deflected by the beam deflecting unit 340. The detector 370 outputs an output signal after detecting the inputted light beam B. The output signal is outputted to the controller 700 so that the controller 700 is capable of calculating a time period (or duration) of the output signal. The detector 370 includes a first detector 371 and a second detector 372. The first detector 371 detects the light beam B which is scanned from the beam deflecting unit 340 to a first non image section Zn1 to be described later, and the second detector 372 detects the light beam B which is scanned from the beam deflecting unit 340 to a second non image section Zn2 to be described later.

Figure 4:
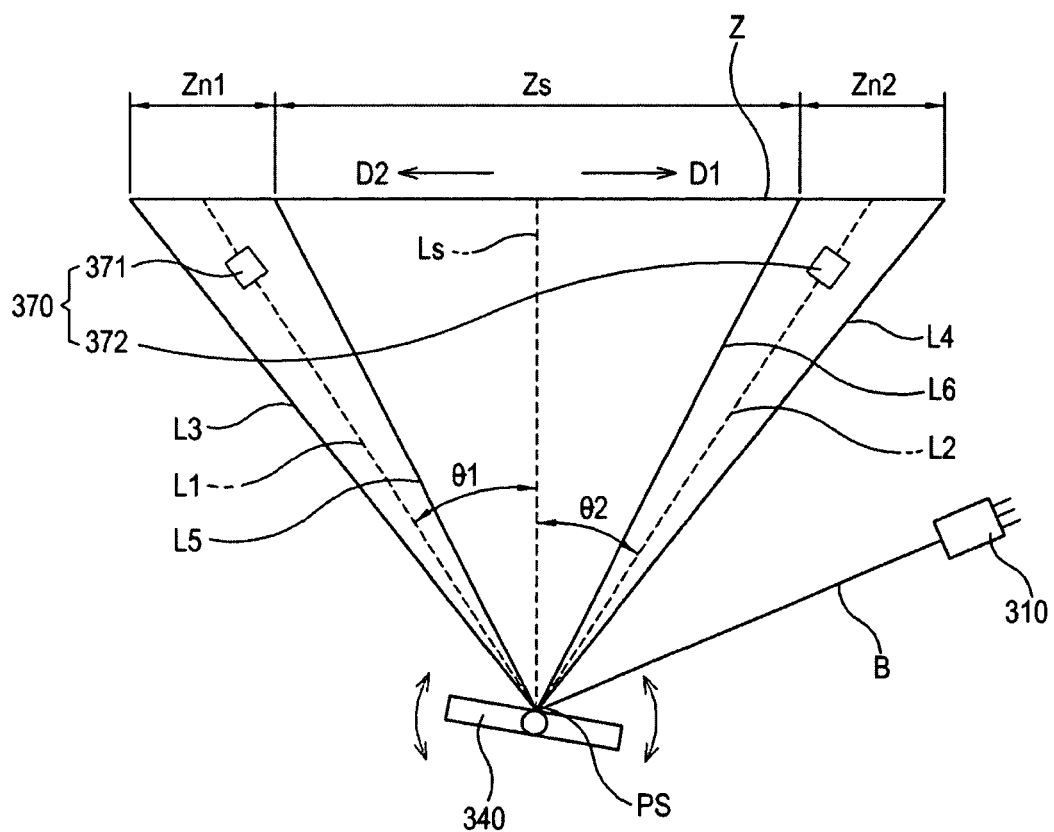
FIG. 4 schematically illustrates a working arrangement of the light scanning unit of FIG. 2.

FIG. 4 schematically illustrates a working arrangement of the light scanning unit 300 of FIG. 2. FIG. 4 schematically illustrates a process to form the scanning line Z which is formed by deflecting the light beam B from the light source 310 by the beam deflecting unit 340. Hereinafter, reference numerals and symbols illustrated in FIG. 4 will be explained.

The reference numerals and symbols are designated as an example and do not limit the scope of the aspects of the present invention.

The scanning line Z is divided into an image section Zs, a first non image section Zn1 and a second non image section Zn2. The image section Zs is located between the first and second non image sections Zn1 and Zn2. The image section Zs, on which the light beam B having the predetermined image information is scanned, is positioned at a center portion of the scanning line Z, and the first and second non image sections Zn1 and Zn2, on which the light beam B not having image information is scanned, are positioned on the outer edges of the image section Zs.

Although the first and second non image sections Zn1 and Zn2 are illustrated to be respectively positioned at right and left sides of the image section Zs in FIG. 4, such illustration is just to distinguish the two non image sections Zn1 and Zn2 which are at the opposite sides of the image section Zs. Accordingly, the positions of the first and second non image sections Zn1 and Zn2 can be changed.

As shown in FIG. 4, a standard point Ps refers to a point where the light beam B from the light source 310 is reflected on the beam deflecting unit 340. A standard line Ls refers to a straight line running from the standard point Ps to a center of the image section Zs. A first scanning direction D1 is a direction from the first non image section Zn1 to the second non image section Zn2. In other words, the first scanning direction D1 is a direction towards the right side in FIG. 4. A second scanning direction D2 is opposite to the first scanning direction D1. In other words, the second scanning direction D2 is a direction towards the left side in FIG. 4.

The first detector 371 is positioned in an area which is formed by running a line from the standard point Ps to opposite end points of the first non image section Zn1, and the second detector 372 is positioned in an area which is formed by running a line from the standard point Ps to opposite end points of the second non image section Zn2. Thus, the respective detectors 371 and 372 are capable of detecting the light beam B from the standard point Ps to the first or second non image sections Zn1 or Zn2.

Accordingly, L1 is a straight line between the standard point Ps and the first detector 371, and L2 is a straight line between the standard point Ps and the second detector 372. L3 is a straight line between the standard point Ps and an end point of the first non image section Zn1 which is not adjacent to the image section Zs. In other words, L3 is the straight line running between the standard point Ps and the farthest end point of the scanning line Z in the second scanning direction D2. L4 is a straight line between the standard point Ps and an end point of the second non image section Zn2 which is not adjacent to the image section Zs. In other words, L4 is the straight line running between the standard point Ps and the farthest end point of the scanning line Z in the first scanning direction D1.

L5 is the straight line running between the standard point Ps and an end point of the image section Zs which is adjacent to the first non image section Zn1 (i.e., the end point of the image section Zs that is closest to the image section Zs in the second scanning direction D2. L6 is the straight line running between the standard point Ps and an end point of the image section Zs which is adjacent to the second non image section Zn2 (i.e., the end point of the image section Zs that is closest to the image section Zs in the first scanning direction D1.

Herein, if a first angle $\theta 1$ is an angle between L1 and the standard line Ls, and a second angle $\theta 2$ is an angle between L2 and the standard line Ls, the first angle $\theta 1$ and the second angle $\theta 2$ may have an equal value. As a corollary thereof, the lengths of the first and second non image sections Zn1 and Zn2 may also be equal. The reasons will be explained later.

As illustrated in FIGS. 2 to 4, the controller 700 transmits the predetermined image information to the light source 310 while the light beam B is being scanned to the image section Zs, and the controller 700 does not transmit the image information to the light source 310 while the light beam B is being scanned to the first and second non image sections Zn1 and Zn2. Also, the controller 700 drives (or operates) the beam deflecting unit 340 to have a predetermined driving frequency so that the light beam B from the light source 310 forms the scanning line Z.

The controller 700 controls the driving unit 210 in order to control a moving speed of the image carrying body 200 in the sub scanning direction. The controller 700 controls the driving unit 210 to drive (or operate) or stop in order to control rotation of the image carrying body 200. The moving speed of the image carrying body 200 in the sub scanning direction is adjusted to correspond to the driving frequency of the beam deflecting unit 340.

The controller 700 also controls an operation of the medium feeding unit 100 so as to adjust a transfer gap between the print media P supplied from the medium feeding unit 100 to the image carrying body 200. The transfer gap between the print media P is adjusted to correspond to the adjusted moving speed of the image carrying body 200. In an aspect of the present invention, the transfer gap refers to a gap between successive sheets of the print media P.

The controller 700 receives the output signal from the detector 370 in real time and calculates a time period (or duration) of the output signal from the detector 370 based on the driving frequency of the beam deflecting unit 340. Also, the controller 700 deduces a time band (frame or duration) of the image section Zs and the first and second non image sections Zn1 and Zn2 based on the calculated time period of the output signal.

The controller 700 measures a time difference of the output signals from the detector 370 when a printing operation starts, and the controller 700 determines whether the measured time difference corresponds to that of the image section Zs or the first and second non image sections Zn1 and Zn2. Also, the controller 700 determines whether the light beam B is scanned to the image section Zs or the non image section Zn1 and Zn2 based on the determined measured time difference.

The controller 700 stops the driving unit 210 if the light beam B is determined to be in the image section Zs, and the controller 700 drives the driving unit 210 if the light beam B is determined to be in one of the first and second non image sections Zn1 and Zn2. The above discussed process is repeated because the light beam B is repeatedly scanned in the first scanning direction D1 and the second scanning direction D2 (that is, to and fro) on the image carrying body 200.

Based on the above discussed process, the gaps of the adjacent scanning lines Z are formed regularly along the sub scanning direction of the image carrying body if the scanning lines Z are in parallel along the sub scanning direction.

Figure 5:
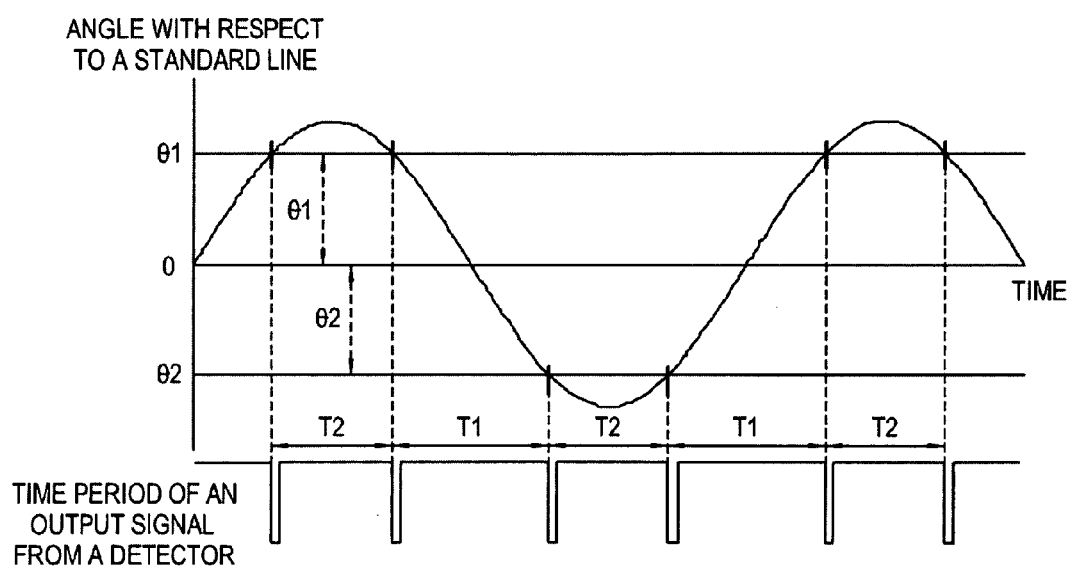
FIG. 5 illustrates a graph showing a driving frequency of a beam deflecting unit and a period of an output signal from a detector in the light scanning unit of FIG. 2.
Figure 6:
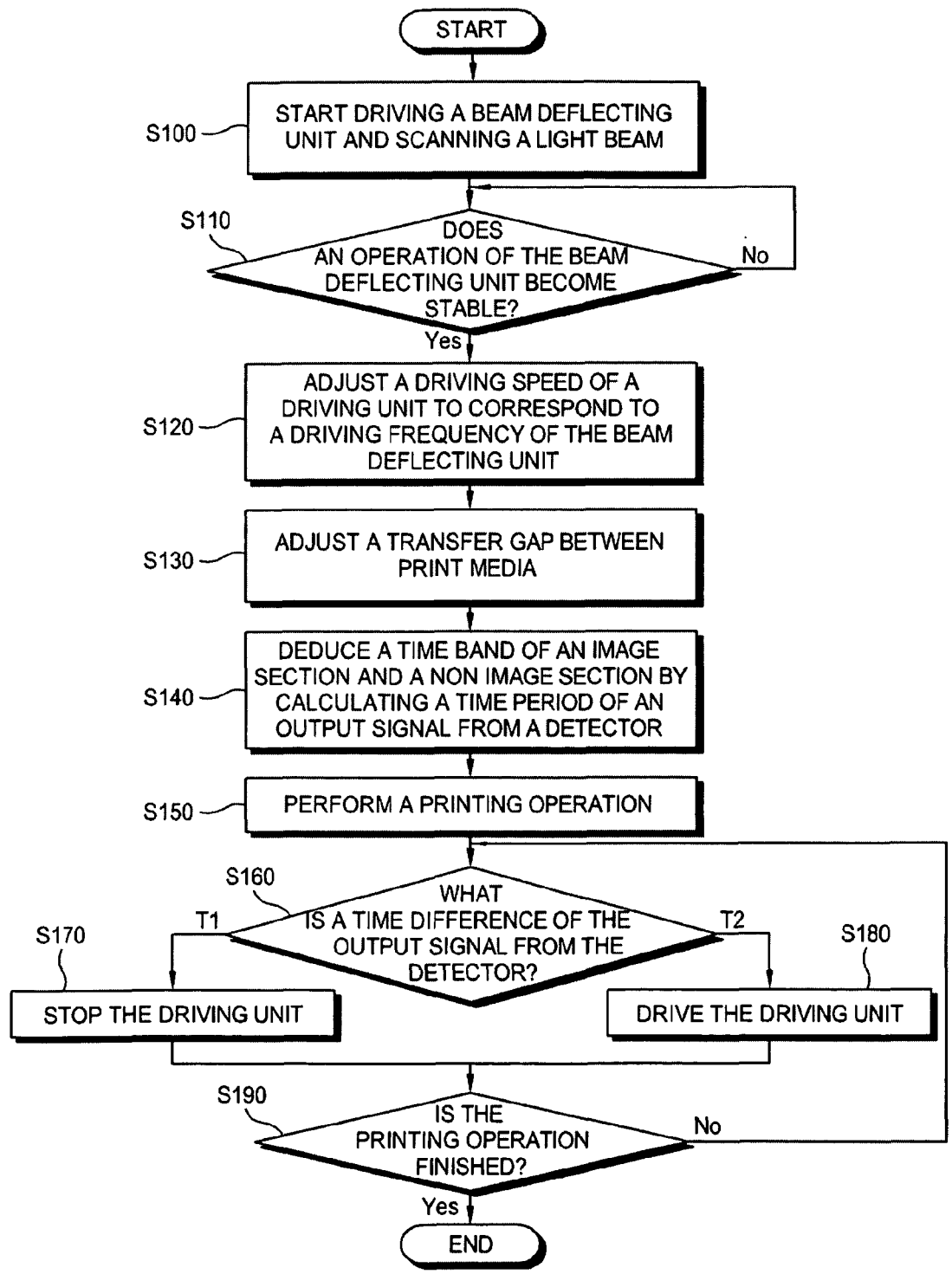
FIG. 6 is an operation flow chart of an image forming apparatus of FIG. 1 according to a graph of FIG. 5.

The aspects of the present invention will be more fully explained by referring to FIGS. 4 to 6. Here, the image forming apparatus 1 is initially not in a driving state, i.e., it is in a stop state or an initial state.

If the image forming apparatus 1 starts driving (or operating), the beam deflecting unit 340 starts to drive (or operate) and deflects the light beam B to the image carrying body 200 at operation S100. The controller 700 determines whether the beam deflecting unit 340 stably drives (or operates) and calculates the driving frequency to drive the beam deflecting unit 340 if the beam deflecting unit 340 stably drives at operation S110.

The controller 700 controls a driving speed of the driving unit 210 to correspond to the driving frequency in order to adjust the moving (or rotating) speed of the image carrying body 200 at operation S120. If the driving speed of driving unit 210 is adjusted, the transfer gap between the print media P is adjusted at operation S130. Because various factors, such as a scanning speed or a scanning angle of the light beam B, are changeable based on the driving frequency of the beam deflecting unit 340, the moving speed of the image carrying body 200 and the transfer gap between the print media P are adjusted to get a high quality image on the print medium P.

The controller 700 is capable of supporting various methods to control the medium feeding unit 100. For instance, the controller 700 controls the rotation and stop of the pick up roller 110 to transfer the print media P in order to have (or obtain) the adjusted transfer gaps between the print media P.

There are many methods to determine the transfer gap D between the print media P. For example, the transfer gap D between the print media P can be calculated by way of a formula 1

$$D=(L/Tp)*[Tt-(Ns*Ts)]$$ [formula 1]

where, L is a length of the print medium P in the medium supplying direction, Tp is a scanning time for one print medium P, Tt is a total time to go from a point of one print medium P to a corresponding point of the next print medium P, Ns is a total number of the scanning lines Z for the one print medium P and Ts is a scan time to form one scanning line Z.

If the driving speed of the driving unit 210 and the transfer gap D between the print media P are determined, the controller 700 calculates the time period of the output signal from the detector 370 to correspond to the driving frequency of the beam deflecting unit 340, and deduces the time band (or time frame or duration) of the image section Zs and the non image section Zn1 and Zn2 at operation S140.

FIG. 5 illustrates a graph showing a driving frequency of a beam deflecting unit 340 and a period of an output signal from a detector 370 in the light scanning unit 300 of FIG. 2. Specifically, FIG. 5 illustrates a graph which shows the driving frequency to drive the beam deflecting unit 340 and the period of the output signal from the detector 370, and which also shows oscillating values of the angle between the standard line Ls and the path of the light beam B, and the period of the output signal from the detector 370 according to time.

A curve illustrated in FIG. 5 will be explained with reference to FIG. 4. The angle between the standard line Ls and the path of the light beam B is 0 degree if the light beam B is on the standard line Ls. While the light beam B is being scanned toward the second scanning direction D2, the curve rises, and if the path of the light beam B is changed from L5 to L1, the angle becomes the first angle θ1. If the light beam B is further scanned to the path L3, the curve reaches a peak. Then, if the path of the light beam B returns to L1, the angle becomes the first angle θ1 again.

Herein, the time band (time frame or duration) that the path of the light beam B moves through L1, L3 and L1 (in other words, when the curve is positioned upside of the first angle θ1) is T2. The light beam B is scanned to the first non image section Zn1 during T2.

While the light beam B is being scanned from L1 toward the first scanning direction D1, the curve goes downward. The angle between the standard line Ls and the path of the light beam B becomes 0 degree if the light beam B is on the standard line Ls. If the path of the light beam B is changed from L6 to L2, the curve further drops and the angle becomes the second angle θ2.

Herein, the time band (time frame or duration) that the path of the light beam B moves from L1 to L2 (in other words, when the curve goes downward from the first angle θ1 to the second angle θ2) is T1. The light beam B is scanned to the image section Zs during T1.

If the path of the light beam B is changed from L2 to L4, the curve has a greater absolute value than that of the second angle θ2, and the curve reaches its lowest value. Next, if the path of the light beam B returns from L4 to L2, the curve rises to the second angle θ2.

Herein, the light beam B is scanned to the second non image section Zn2 during a time band (time frame or duration) that the path of the light beam B moves through L2, L4 and L2. In other words, the curve is positioned at a lower side of the first angle θ1. However, if magnitude of the first angle θ1 is equal to that of the second angle θ2, and the length of the first non image section Zn1 is equal to the second non image section Zn2, then the time band (time frame or duration) of the first non image section Zn1 is equal to that of the second non image section T2.

On the same principle, the time band (time frame or duration) that the path of the light beam B takes to move from L2 to L1 (in other words, when the curve rises from the second angle θ2 to the first angle θ1) becomes T1. Thus, if the time band (time frame or duration) is within T1, the light beam B is on the image section Zs (or substantially on the image section Zs), and if the time band (time frame or duration) is within T2, the light beam B is on the non image section Zn1 and Zn2. Whether the light beam B is on the image section Zs at T1 or on the non image section Zn1 and Zn2 at T2 is without regard to the scanning direction of the light beam B, such as the first scanning direction D1 and the second scanning direction D2.

By determining whether the time band (time frame or duration) is T1 or T2, the image forming apparatus 1 does the printing operation at operation S150. During the printing operation, the controller 700 controls the driving unit 210 and the medium feeding unit 100 based on the adjusted driving speed of the driving unit 210 and the transfer gap of the print media P.

Next, the controller 700 measures the time difference of the output signal from the detector 370 in real time, and determines whether the measured time difference corresponds to time band (time frame or duration) T1 or T2 at operation S160.

If the measured time difference corresponds to T1, the controller 700 stops the driving unit 210 to stop the image carrying body 200 from moving in the sub scanning direction at operation S170. In addition, if the measured time difference corresponds to T2, the controller 700 drives the driving unit 210 to move the image carrying body 200 in the sub scanning direction at operation S180. Thereafter, the controller 700 determines whether the printing operation is finished or not, and based on the determination result, the controller 700 repeatedly performs the above discussed operation or finishes a printing job at operation S190.

Herein, the driving unit 210 operates only while the light beam B is scanned onto the non image section Zn1 and Zn2 so that a start time and a finish time of driving (or operation) can be changeable while the light beam B is scanned onto the non image section Zn1 and Zn2. For example, the start time of driving (or operation) may be the time when the path of the light beam B is at L3 or L4. In other words, the start time of driving (or operation) may be when the curve in FIG. 5 is at the peak or at the lowest value, which considers a time error which may be generated in controlling the driving unit 210 by the controller 700.

According to the above discussed configuration, the driving unit 210 stops while the light beam B is scanned onto the image section Zs, and the driving unit 210 drives (or operates) while the light beam B is scanned onto the non image section Zn1 and Zn2. Thus, the adjacent scanning lines Z are regularly arranged relative to one another along the sub scanning direction of the image carrying body 200, and a plurality of the scanning lines Z are provided evenly and regularly along the sub scanning direction of the image carrying body 200.

As described above, the scanning lines Z are regularly arranged along the sub scanning direction of the image carrying body 200 in a range in which the image is formed so that the present invention is capable of preventing the print medium P from being printed with poor quality. Thus, the image quality on the print medium becomes good so that reliability of the image forming apparatus 1 of the present invention will be improved.

In various aspects, image forming devices include photocopiers, printers, facsimile machines, and multifunction peripherals (MFP, which offer functions of the preceding devices in a single device).

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. An image forming apparatus comprising:
   an image carrying body;
   a driving unit which rotates the image carrying body in a medium supplying direction;
   a light scanning unit which comprises a light source and a beam deflecting unit to scan a light beam from the light source to and fro in a main scanning direction to form a scanning line having an image section and a non image section; and
   a controller which stops the driving unit if the light beam from the beam deflecting unit is on the image section, and drives the driving unit if the light beam is on the non image section.

2. The image forming apparatus according to claim 1, wherein the controller controls the driving unit to adjust a rotation speed of the image carrying body to correspond to a driving frequency of the beam deflecting unit.

3. The image forming apparatus according to claim 2, further comprising a medium feeding unit which supplies print media to the image carrying body in a way that each print medium has a predetermined transfer gap D with an adjacent print medium, and
   the controller controls the medium feeding unit to adjust the transfer gap D between the print media to correspond to the adjusted rotation speed of the image carrying body.

4. The image forming apparatus according to claim 3, wherein the transfer gap D between the print media is calculated by a formula 1

$$D=(L/Tp)*[Tt-(Ns*Ts)], \quad \text{[formula 1]}$$

where L is a length of each print medium in the medium supplying direction, Tp is a scanning time for one print medium, Tt is a total time from a point of one print medium to a corresponding point of the next print medium, Ns is a total number of scanning lines for the one print medium, and Ts is a scanning time to form one scanning line.

5. The image forming apparatus according to claim 1, wherein the light scanning unit comprises a detector to detect the light beam from the beam deflecting unit that is scanned to the non image section.

6. The image forming apparatus according to claim 5, wherein the controller calculates a time period of an output signal from the detector based on a driving frequency of the beam deflecting unit, and deduces a time band of the image section and the non image section based on the time period.

7. The image forming apparatus according to claim 6, wherein the controller measures a time difference of the output signal from the detector in real time and compares the time band with the time difference to determine whether the light beam is on the image section or the non image section.

8. The image forming apparatus according to claim 1, wherein the beam deflecting unit comprises a resonance mirror.

9. A control method of an image forming apparatus which comprises an image carrying body being rotated in a medium supplying direction by a driving unit and a light scanning unit to scan a light beam on to the image carrying body, wherein the light scanning unit comprises a light source and a beam deflecting unit to scan a light beam from the light source to and fro in a main scanning direction to form a scanning line having an image section and a non image section, and a detector to detect the light beam from the beam deflecting unit to the non image section, the method comprising:
   deducing a time band of the image section and the non image section based on a time period of an output signal from the detector; and
   controlling the driving unit to stop driving the image carrying body if the light beam is on the image section, and to drive the image carrying body if the light beam is on the non image section.

10. The control method of the image forming apparatus according to claim 9, wherein the deducing of the time band comprises calculating the time period of the output signal from the detector based on a driving frequency of the beam deflecting unit.

11. The control method of the image forming apparatus according to claim 10, wherein the controlling of the driving unit comprises determining whether the light beam is on the image section or the non image section by comparing a time difference of the output signal from the detector with the deduced time band.

12. The control method of the image forming apparatus according to claim 9, further comprising controlling the driving unit to adjust a rotation speed of the image carrying body to correspond to a driving frequency of the beam deflecting unit before deducing the time band.

13. The control method of the image forming apparatus according to claim 12, wherein the image forming apparatus further comprises a medium feeding unit to supply print media to the image carrying body in a way that each print medium has a predetermined transfer gap D with an adjacent print medium, and
   controlling the medium feeding unit to adjust the transfer gap D between the print media to correspond to the adjusted rotation speed of the image carrying body.

14. The control method of the image forming apparatus according to claim 13, wherein the transfer gap D between the print media is calculated by a formula 1

$$D=(L/Tp)*[Tt-(Ns*Ts)] \quad \text{[formula 1]}$$

where, L is a length of each print medium in the medium supplying direction, Tp is a scanning time for one print medium, Tt is a total time from a point of one print medium to a corresponding point of the next print medium, Ns is a total number of scanning lines for the one print medium and Ts is a scanning time to form one scanning line.

15. The control method of the image forming apparatus according to claim 9, wherein the beam deflecting unit comprises a resonance mirror.

* * * * *

UNITED STATES PATENT AND TRADEMARK OFFICE
CERTIFICATE OF CORRECTION

| | | |
|---|---|---|
| PATENT NO. | : 8,564,636 B2 | Page 1 of 1 |
| APPLICATION NO. | : 12/144816 | |
| DATED | : October 22, 2013 | |
| INVENTOR(S) | : Se-tae Kim | |

It is certified that error appears in the above-identified patent and that said Letters Patent is hereby corrected as shown below:

On the Title Page, Item (54) and in the Specification, in Column 1, Line 1, (Title), Delete "APPARTUS" and insert -- APPARATUS --, therefor.

Signed and Sealed this
Eighteenth Day of February, 2014

Michelle K. Lee
*Deputy Director of the United States Patent and Trademark Office*